United States Patent
Kudo et al.

(10) Patent No.: US 8,328,346 B2
(45) Date of Patent: Dec. 11, 2012

(54) INK JET RECORDING METHOD AND INK JET RECORDING APPARATUS

(75) Inventors: Satoshi Kudo, Kawasaki (JP); Kumiko Mafune, Kawasaki (JP); Yojiro Kojima, Tokyo (JP); Yoshio Kinoshita, Tachikawa (JP); Yukako Tamanuki, Tokyo (JP); Shogo Takemoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 13/165,143

(22) Filed: Jun. 21, 2011

(65) Prior Publication Data

US 2011/0310164 A1   Dec. 22, 2011

(30) Foreign Application Priority Data

Jun. 22, 2010   (JP) .................... 2010-141941

(51) Int. Cl.
*G01D 11/00* (2006.01)
*B41J 29/38* (2006.01) M

(52) U.S. Cl. ......................................... 347/100; 347/16

(58) Field of Classification Search ............... 347/16, 347/20, 95, 100; 106/31.86; 524/88, 317
See application file for complete search history.

(56) References Cited

U.S. PATENT DOCUMENTS 8,114,208 B2 * 2/2012 Nakata et al. ............... 106/31.48
8,226,222 B2 * 7/2012 Kajiura et al. ................ 347/95

FOREIGN PATENT DOCUMENTS

| JP | 8-073791 A | 3/1996 |
| JP | 11-268256 A | 10/1999 |
| JP | 2000-169776 A | 6/2000 |
| JP | 2003-231834 A | 8/2003 |
| JP | 2006-143989 A | 6/2006 |
| JP | 2007-091631 A1 | 8/2007 |
| WO | 2004-104108 A1 | 12/2004 |
| WO | 2008-066062 A1 | 6/2008 |

* cited by examiner

*Primary Examiner* — An Do
(74) *Attorney, Agent, or Firm* — Canon U.S.A., Inc., IP Division

(57) ABSTRACT

An ink jet recording method includes an image formation step of forming an image on a recording medium having an ink-receiving layer by ejecting an ink from an ink jet recording head and a humidification step of humidifying a gap between the recording head and the recording medium, in which in the image formation step, at least a cyan ink containing a specific dye and a magenta ink containing a specific dye are used.

8 Claims, 1 Drawing Sheet

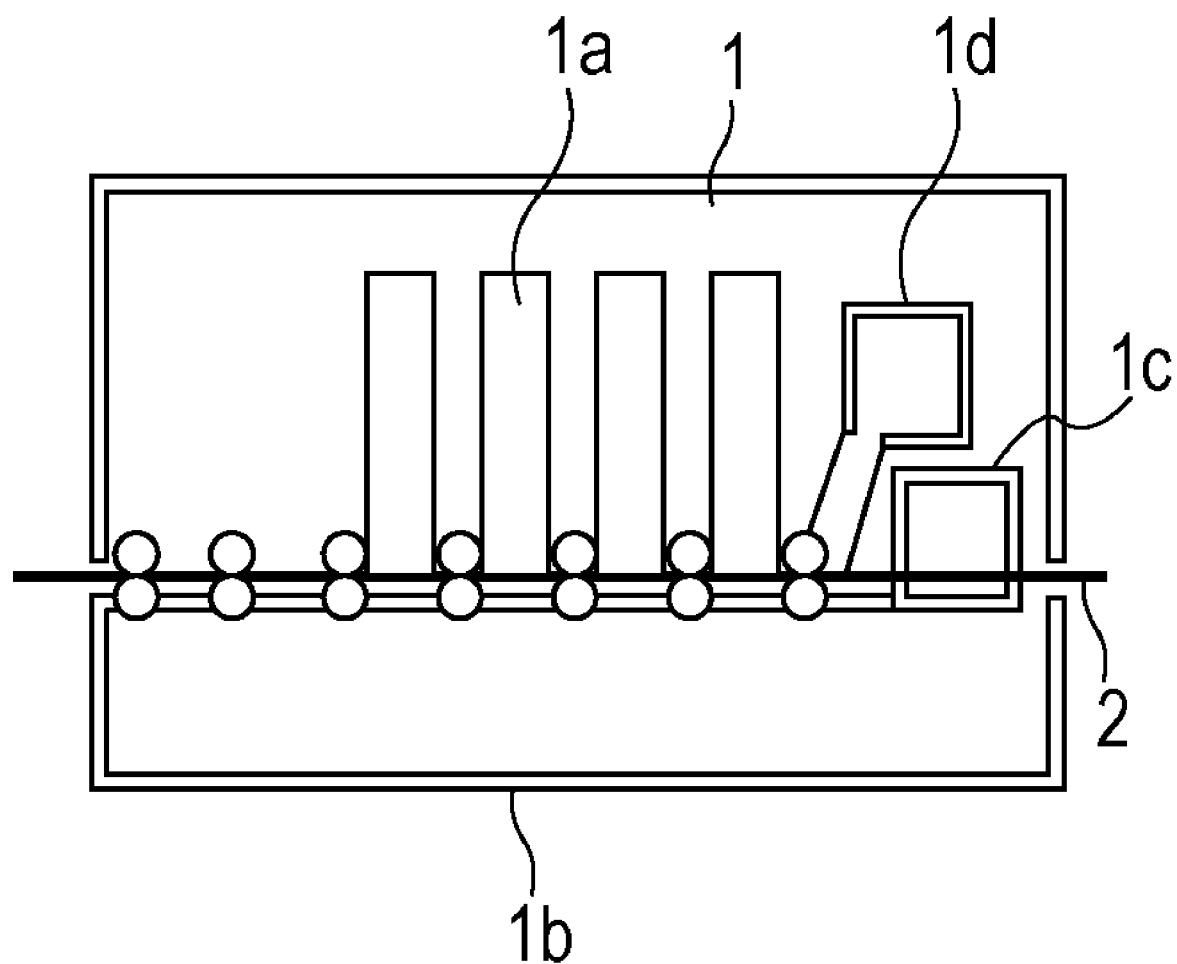

INK JET RECORDING METHOD AND INK JET RECORDING APPARATUS

BACKGROUND OF THE INVENTION

1. Field of the Invention

The present invention relates to an ink jet recording method and an ink jet recording apparatus.

2. Description of the Related Art

The output form of an image has rapidly shifted from a silver halide process to an ink jet process because of an increase in the quality of an image formed by an ink jet recording method. Under such circumstances, an image is required to have higher fastness properties, such as ozone resistance and bronzing resistance. For example, International Publication No. WO2007/091631 discloses that excellent ozone resistance is achieved by the use of an azaphthalocyanine dye, in which outer aromatic rings of a phthalocyanine skeleton are nitrogen-containing heteroaromatic rings.

To achieve higher quality of an image in an ink jet recording method, there have been advances in the minimization of an ink droplet. An increase in reliability has also been required. In recent years, intermittent ejection stability has been one of particularly important reliability issues. In the case of forming an image by ink jet recording method, if a state is continued in which the recovery operation of a recording head is not performed and in which an ink is not ejected from an ejection orifice of the recording head for a certain period of time, the evaporation of water and so forth in ink proceeds from the ejection orifice of the recording head. Then when an attempt is made to eject the next first droplet of the ink from the ejection orifice, the ink can be unstably ejected or the ink cannot be ejected, thereby disturbing an image. To improve the reliability, for example, Japanese Patent Laid-Open No. 11-268256 discloses a recording method by which recording can be performed even on a material with low affinity to ink and which suppresses scattering of water from ink droplets and clogging of a recording head by humidifying a gap between a recording head and a recording medium.

International Publication No. WO2007/091631 improves the ozone resistance and the bronzing resistance of an image formed on a recording medium having an ink-receiving layer. However, it was also found that in the case where an image is formed with ink containing the dye by an ink jet recording method including a humidification step, another problem of a reduction in the bronzing resistance of a secondary color image made of magenta and cyan inks is caused.

SUMMARY OF THE INVENTION

The inventors have conducted intensive studies and have found that the use of the azaphthalocyanine dye described in Accordingly, aspects of the present invention provide an ink jet recording method that suppresses a reduction in the bronzing resistance of a secondary color image even if a gap between a recording head and a recording medium is humidified to improve the intermittent ejection stability of ink. Furthermore, aspects of the present invention provide an ink jet recording apparatus that provides the foregoing beneficial effects.

According to one aspect of the present invention, an ink jet recording method includes an image formation step of forming an image on a recording medium having an ink-receiving layer by ejecting an ink from an ink jet recording head, and a humidification step of humidifying a gap between the recording head and the recording medium, in which in the image formation step, at least a cyan ink containing a dye represented by general formula (I) and a magenta ink containing a dye represented by general formula (II) are used:

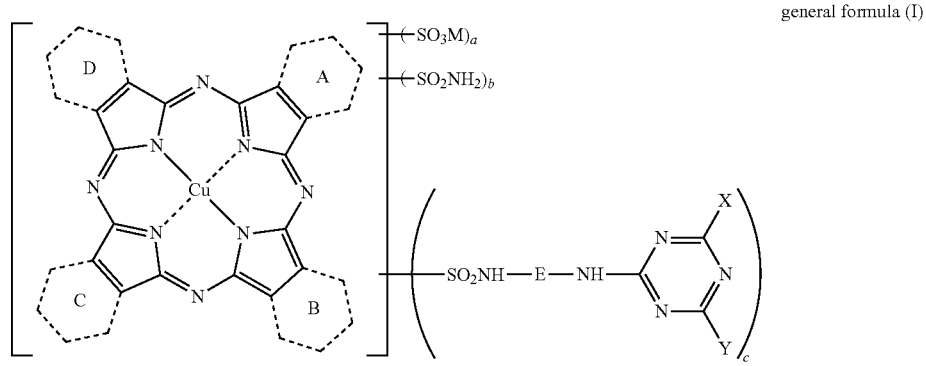

general formula (I)

wherein in general formula (I), A, B, C, and D each independently represent an six-membered ring having aromaticity, and at least one of A, B, C, and D represents a pyridine ring or a pyrazine ring; M's each independently represents a hydrogen atom, an alkali metal, ammonium, or organic ammonium; E represents an alkylene group; X represents a sulfo-substituted anilino group, a carboxy-substituted anilino group, or a phosphono-substituted anilino group, and the substituted anilino group may further contain one to four substituents of at least one type of substituent selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, an ureido group, an alkyl group, a nitro group, a cyano group, a halogen atom, an alkylsulfonyl group, and an alkylthio group; Y represents a hydroxy group or an amino group; and a, b, and c satisfy $0 \leq a \leq 2.0$, $0 \leq b \leq 3.0$, and $0.1 \leq c \leq 3.0$, provided that a+b+c=1.0 to 4.0 and

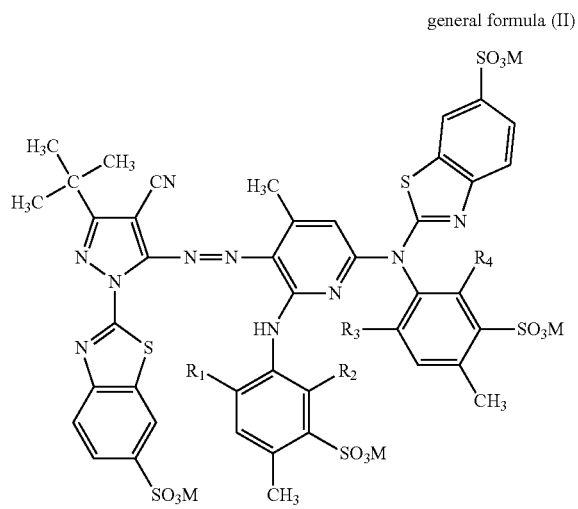

general formula (II)

wherein in general formula (II), $R_1$, $R_2$, $R_3$, and $R_4$ each independently represent an alkyl group; and M's each independently represent a hydrogen atom, an alkali metal, ammonium, or organic ammonium.

Further features of the present invention will become apparent from the following description of exemplary embodiments with reference to the attached drawing.

BRIEF DESCRIPTION OF THE DRAWINGS

FIGURE is a schematic diagram of the main portion of an ink jet recording apparatus according to aspects of the present invention.

DESCRIPTION OF THE EMBODIMENTS

Embodiments of the present invention will be described below in detail. Hereinafter, a dye represented by general formula (I) and a dye represented by general formula (II) are also referred to as a dye of general formula (I) and a dye of general formula (II), respectively. A bronzing phenomenon is caused by aggregating and stacking a dye in an ink-receiving layer of a recording medium. From the viewpoint of a coloring material, the bronzing phenomenon is known to be significantly caused in a phthalocyanine dye, which has excellent ozone resistance. The dye of general formula (I), which is described below, used in aspects of the present invention has improved ozone resistance by increasing aggregability, so that the bronzing phenomenon is liable to occur. In the case of humidifying a gap between a recording head and the recording medium to improve intermittent ejection stability, the ink-receiving layer of the recording medium absorbs water. This slows the penetration of ink into the recording medium. So, the dye of general formula (I) is liable to aggregate in the vicinity of a surface of the recording medium. Thus, the bronzing phenomenon is more liable to occur. In the case where a primary color image and a secondary color image are formed using the same amount of a cyan ink applied, the total amount of the ink applied per unit area of the secondary color image is larger than that of the primary color image. This further slows the penetration of the ink into the recording medium. So, the occurrence of the bronzing phenomenon is particularly noticeable.

The inventors have conducted studies and have found that the presence of the dye of general formula (II), which is described below, in a magenta ink used together with the cyan ink containing the dye of general formula (I) improves the bronzing resistance of the secondary color image even when humidification is performed. The inventors speculate that the reason for this is as follows: The dye of general formula (II) has high fixability to the ink-receiving layer of the recording medium. So, when an ink containing the dye of general formula (II) is applied to the recording medium, the ink is readily fixed in the vicinity of a surface of the ink-receiving layer of the recording medium because of its high fixability. In the secondary color image formed using the magenta ink and the cyan ink that contains the dye of general formula (I), the dye of general formula (II) is probably arranged between aggregates of the dye of general formula, thereby suppressing the occurrence of the bronzing phenomenon. It is believed that in this case, the dye of general formula (II) is arranged between the aggregates of the dye of general formula (I) and thus does not inhibit the aggregation of the dye of general formula (I), so that excellent ozone resistance of the dye of general formula (I) is not impaired.

Ink Jet Recording Method

An aspect of the present invention is characterized by including an image formation step of forming an image on a recording medium having an ink-receiving layer using the plural inks and a humidification step of humidifying a gap between a recording head and a recording medium.

Image Formation Step

In aspects of the present invention, the image formation step of ejecting an ink from an ink jet recording head to form an image on a recording medium having an ink-receiving layer is performed. In the image formation step, at least a cyan ink containing a dye represented by general formula (I) and a magenta ink containing a dye represented by general formula (II) described below are used. The cyan ink and magenta ink can be applied onto the recording medium so as to be overlapped in at least one region of the recording medium, thereby forming an image including a secondary color region. An exemplary method for ejecting an ink includes applying thermal energy or mechanical energy to the ink. In aspects of the present invention, a method for ejecting an ink by the application of thermal energy can be employed.

Recording Medium

The recording medium used in aspects of the present invention may have an ink-receiving layer and can have a glossy surface or a semi-glossy surface. Specifically, the recording medium can have an ink-receiving layer on at least one surface of a support, the ink-receiving layer mainly containing a pigment composed of, for example, silica, alumina, or its hydrate, and optionally containing an additive, for example, a binder or a cationic polymer. In the recording medium, ink is absorbed by pores of a porous structure formed of pigment particles to form an image with high quality.

As the support, a support which is capable of being provided with the ink-receiving layer and which has stiffness such that the support can be conveyed by a conveying mechanism of an ink jet recording apparatus can be used. An example of the support is paper containing pulp or a filler. A recording medium may be used in which a resin layer composed of, for example, polyolefin, is arranged on at least one surface of a support and in which an ink-receiving layer is arranged on the resin layer. Furthermore, a recording medium may be used in which ink-receiving layers are arranged on both surfaces of a support.

The recording medium used in the ink jet recording method according to aspects of the present invention may be cut into predetermined size in advance. Alternatively, the recording medium may be a wound sheet in the form of a roll, the wound sheet being to be cut into predetermined size after the formation of an image.

Ink

Coloring Material of Cyan Ink: Dye Represented by General Formula (I)

A coloring material contained in the cyan ink used in aspects of the present invention is a dye which has excellent ozone resistance and which is represented by general formula (I):

general formula (I)

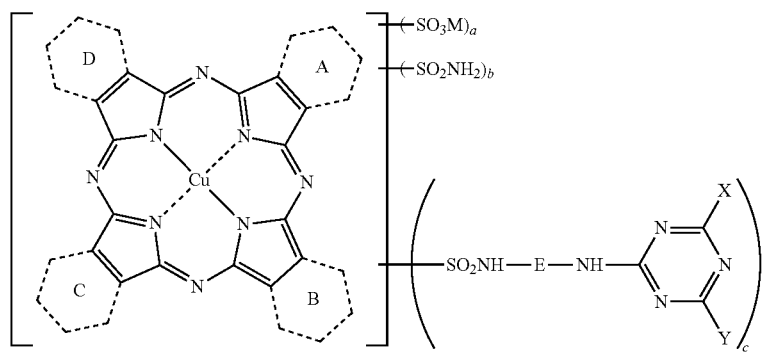

wherein in general formula (I), A, B, C, and D each independently represent an six-membered ring having aromaticity, and at least one of A, B, C, and D represents a pyridine ring or a pyrazine ring; M's each independently represents a hydrogen atom, an alkali metal, ammonium, or organic ammonium; E represents an alkylene group; X represents a sulfo-substituted anilino group, a carboxy-substituted anilino group, or a phosphono-substituted anilino group, and the substituted anilino group may further contain one to four substituents of at least one type of substituent selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, an ureido group, an alkyl group, a nitro group, a cyano group, a halogen atom, an alkylsulfonyl group, and an alkylthio group; Y represents a hydroxy group or an amino group; and a, b, and c satisfy $0 \leq a \leq 2.0$, $0 \leq b \leq 3.0$, and $0.1 \leq c \leq 3.0$, provided that $a+b+c=1.0$ to $4.0$. In aspects of the present invention, the content (% by mass) of the dye of general formula (I) in the cyan ink may be in the range of 0.1% by mass or more to 10.0% by mass or less, such as 0.5% by mass or more to 5.0% by mass or less with respect to the total mass of the ink. A content of less than 0.1% by mass can lead to an image having insufficient ozone resistance. A content of more than 10.0% by mass can lead to insufficient ejection stability of the ink.

In general formula (I), A, B, C, and D each independently represent a six-membered ring having aromaticity, and at least one of A, B, C, and D represents a pyridine ring or a pyrazine ring. Examples of the six-membered ring having aromaticity include a benzene ring, a pyridine ring, and a pyrazine ring. Among these rings, a pyridine ring can be used. In aspects of the present invention, a dye can be used in which one to three of A, B, C, and D is pyridine rings or pyrazine rings and in which the remainder is a benzene ring.

In general formula (I), E represents an alkylene group. The number of carbon atoms in the alkylene group is may be in the range of 2 to 12 and such as 2 to 6. Specific examples of the alkylene group include an ethylene group, a propylene group, a butylene group, a pentylene group, a hexylene group, a cyclopropylenediyl group, a 1,2- or 1,3-cyclopentylenediyl group, and a 1,2-, 1,3-, or 1,4-cyclohexylene group. Among these groups, an ethylene group, a propylene group, and a butylene group can be used.

In general formula (I), X represents a sulfo-substituted anilino group, a carboxy-substituted anilino group, or a phosphono-substituted anilino group. The substituted anilino group may further contain zero to four substituents and even zero to two of at least one type of substituent selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, an ureido group, an alkyl group, a nitro group, a cyano group, a halogen atom, an alkylsulfonyl group, and an alkylthio group. Specific examples of X include a 2,5-disulfoanilino group, a 2-sulfoanilino group, a 3-sulfoanilino group, a 4-sulfoanilino group, a 2-carboxyanilino group, a 4-ethoxy-2-sulfoanilino group, a 2-methyl-5-sulfoanilino group, a 2-methoxy-4-nitro-5-sulfoanilino group, a 2-chloro-5-sulfoanilino group, a 3-carboxy-4-hydroxyanilino group, a 3-carboxy-4-hydroxy-5-sulfoanilino group, a 2-hydroxy-5-nitro-3-sulfoanilino group, 4-acetylamino-2-sulfoanilino group, a 4-anilino-3-sulfoanilino group, a 3,5-dicarboxyanilino group, a 2-carboxy-4-sulfamoylanilino group, a 2,5-dichloro-4-sulfoanilino group, and a 3-phosphonoanilino group. In general formula (I), Y represents a hydroxy group or an amino group.

In general formula (I), for example, a sulfonic acid group, a carboxy group, and a phosphono group may be in the form of a salt. Examples of a counter ion that can form a salt include ions of alkali metals, ammonium ions, and organic ammonium ions. Examples of the alkali metal include lithium, sodium, and potassium. Examples of the organic ammonium include alkylamines having 1 to 3 carbon atoms, such as methylamine and ethylamine; and onium salts of mono-, di-, or tri-alkanolamine having 1 to 4 carbon atoms, such as monoethanolamine, diethanolamine, triethanolamine, monoisopropanolamine, diisopropanolamine, and triisopropanolamine. An alkali-earth metal, for example, calcium or magnesium, may be used as the counter ion.

Specific examples of the dye of general formula (I) include exemplified compounds C1 to C24 shown in Table 1. Table 1 shows groups of A, B, C, D, E, X, and Y in general formula (I). The dye according to aspects of the present invention is not limited to the exemplified compounds described below as long as it has a structure included in the structure of general formula (I) and it is included in the definition of general formula (I). Because at least one of A, B, C, and D in general formula (I) is a pyridine ring or a pyrazine ring, regioisomers with respect to the position of the nitrogen atom are present. So, in the case of synthesizing a compound, a mixture of these regioisomers is obtained. It is difficult to isolate these isomers. Furthermore, it is difficult to identify these isomers by analysis. Thus, the dye of general formula (I) is usually used as a mixture. However, even when the dye contains these isomers, the advantageous effects of aspects of the present invention are obtained without change. So, in this specification, these isomers are not distinguished. With respect to A, B, C, and D in general formula (I) according to aspects of the present invention, the number of pyridine rings may be in the range of 1 to 3, such as 1 to 2. Specifically, among the exemplified compounds, exemplified compounds C1 to C3, C10 to C12, and C21 to C23 can be used.

TABLE 1

Exemplified dye compound represented by general formula (I)

| Exemplified compound | A | B | C | D | E | X | Y | a | b | c |
|---|---|---|---|---|---|---|---|---|---|---|
| C1  | 2,3-PD | Bz     | Bz     | Bz | Et | 2,5-disulfoanilino            | $NH_2$ | 0 | 2 | 1 |
| C2  | 2,3-PD | 2,3-PD | Bz     | Bz | Et | 2,5-disulfoanilino            | $NH_2$ | 0 | 1 | 1 |
| C3  | 2,3-PD | Bz     | 2,3-PD | Bz | Et | 2,5-disulfoanilino            | $NH_2$ | 0 | 1 | 1 |
| C4  | 2,3-PD | 2,3-PD | 2,3-PD | Bz | Et | 2,5-disulfoanilino            | $NH_2$ | 0 | 0 | 1 |
| C5  | 2,3-PD | Bz     | Bz     | Bz | Et | 4-sulfoanilino                | $NH_2$ | 0 | 2 | 1 |
| C6  | 2,3-PD | Bz     | Bz     | Bz | Et | 2,5-disulfoanilino            | OH     | 0 | 2 | 1 |
| C7  | 2,3-PD | Bz     | Bz     | Bz | Et | 3,5-dicarboxyanilino          | $NH_2$ | 0 | 2 | 1 |
| C8  | 2,3-PD | Bz     | Bz     | Bz | Pr | 2,5-disulfoanilino            | $NH_2$ | 0 | 2 | 1 |
| C9  | 2,3-PD | Bz     | Bz     | Bz | Et | 2-carboxy-4-sulfoanilino      | $NH_2$ | 0 | 2 | 1 |
| C10 | 2,3-PZ | Bz     | Bz     | Bz | Et | 2,5-disulfoanilino            | $NH_2$ | 0 | 2 | 1 |
| C11 | 2,3-PZ | 2,3-PZ | Bz     | Bz | Et | 2,5-disulfoanilino            | $NH_2$ | 0 | 1 | 1 |
| C12 | 2,3-PZ | Bz     | 2,3-PZ | Bz | Et | 2,5-disulfoanilino            | $NH_2$ | 0 | 1 | 1 |
| C13 | 2,3-PZ | 2,3-PZ | 2,3-PZ | Bz | Et | 2,5-disulfoanilino            | $NH_2$ | 0 | 0 | 1 |
| C14 | 2,3-PD | Bz     | Bz     | Bz | Et | 2-methoxy-5-sulfoanilino      | $NH_2$ | 0 | 2 | 1 |
| C15 | 2,3-PD | Bz     | Bz     | Bz | Et | 2-nitro-4-sulfoanilino        | $NH_2$ | 0 | 2 | 1 |
| C16 | 2,3-PD | Bz     | Bz     | Bz | Et | 2,5-dichloro-4-sulfoanilino   | $NH_2$ | 0 | 2 | 1 |
| C17 | 2,3-PD | Bz     | Bz     | Bz | Bt | 2,5-disulfoanilino            | $NH_2$ | 0 | 2 | 1 |
| C18 | 2,3-PD | Bz     | Bz     | Bz | Et | 3-carboxy-4-hydroxy-5-sulfoanilino | $NH_2$ | 0 | 2 | 1 |
| C19 | 2,3-PD | Bz     | Bz     | Bz | Et | 2-sulfoanilino                | OH     | 0 | 2 | 1 |
| C20 | 2,3-PD | Bz     | Bz     | Bz | Et | 3-sulfoanilino                | OH     | 0 | 2 | 1 |
| C21 | 3,4-PD | Bz     | Bz     | Bz | Et | 2,5-disulfoanilino            | $NH_2$ | 0 | 2 | 1 |
| C22 | 3,4-PD | 3,4-PD | Bz     | Bz | Et | 2,5-disulfoanilino            | $NH_2$ | 0 | 1 | 1 |
| C23 | 3,4-PD | Bz     | 3,4-PD | Bz | Et | 2,5-disulfoanilino            | $NH_2$ | 0 | 1 | 1 |
| C24 | 3,4-PD | 3,4-PD | 3,4-PD | Bz | Et | 2,5-disulfoanilino            | $NH_2$ | 0 | 0 | 1 |

2,3-PD: 2,3-pyrido
2,3-PZ: 2,3-pyrazino
Bz: benzo
Et: ethylene
Pr: propylene
Bt: butylene Coloring Material of Magenta Ink: Dye Represented by General Formula (II)

A coloring material contained in the magenta ink used in aspects of the present invention is a dye which has relatively high hydrophobicity and high fixability to the ink-receiving layer of the recording medium and which is represented by general formula (II):

general formula (II)

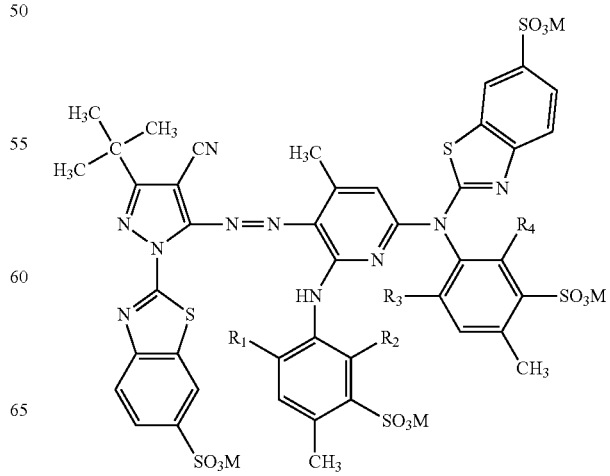

wherein in general formula (II), $R_1$, $R_2$, $R_3$, and $R_4$ each independently represent an alkyl group; and M's each independently represent a hydrogen atom, an alkali metal, ammonium, or organic ammonium. In aspects of the present invention, the content (% by mass) of the dye of general formula (II) in the magenta ink can be in the range of 1.5% by mass or more to 5.0% by mass or less with respect to the total mass of the ink. A content of less than 1.5% by mass or a content of more than 5.0% by mass can lead to a secondary color image having insufficient bronzing resistance. In particular, a content of more than 5.0% by mass results in an excessive amount of the dye of general formula (II) fixed in the vicinity of a surface of the ink-receiving layer of the recording medium. This excessively inhibits the penetration of the cyan ink into the recording medium. As a result, the dye of general formula (I) can be readily aggregated in the vicinity of the surface of the ink-receiving layer of the recording medium, thus resulting in insufficient bronzing resistance.

The alkyl group in general formula (II) can have 1 to 3 carbon atoms from the viewpoint of achieving good solubility in an aqueous medium contained in the ink. Specific examples thereof include a methyl group, an ethyl group, a primary propyl group, and a secondary propyl group. If the number of carbon atoms in the alkyl group is 4 or more, the coloring material can have excessively high hydrophobicity and thus can be less likely to be dissolved in the aqueous medium contained in the ink.

In general formula (II), M's each independently represent a hydrogen atom, an alkali metal, ammonium, or organic ammonium. Examples of the alkali metal include lithium, sodium, and potassium. Examples of the organic ammonium include acetamide, benzamide, methylamino, butylamino, diethylamino, triethylamine, and phenylamino.

Examples of the dye of general formula (II) can include exemplified compounds M1 and M2 described below. Note that the following exemplified compounds are described in the form of a free acid. The dye according to aspects of the present invention is not limited to the exemplified compounds described below as long as it has a structure included in the structure of general formula (II) and it is included in the definition of general formula (II). In aspects of the present invention, among these exemplified compounds described above, exemplified compound M2, in which each of $R_1$, $R_2$, $R_3$, and $R_4$ in general formula (II) represents an ethyl group, can be used.

exemplified compound M1

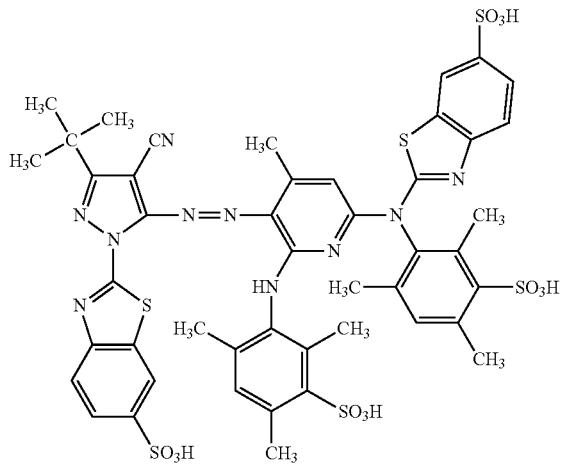

exemplified compound M2

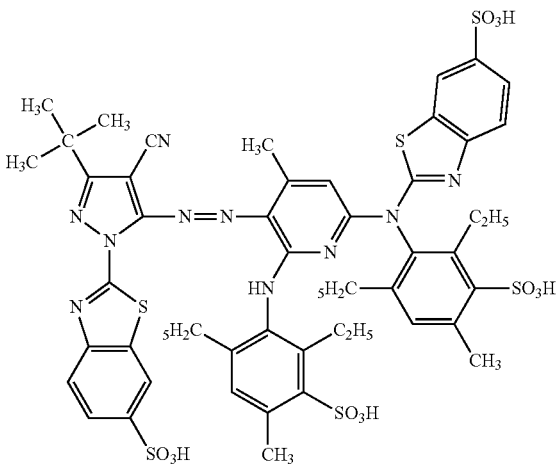

Preferred Embodiments of Magenta Ink: Magenta Dye Having IOB Value of 2.0 or More and Water-Soluble Organic Compound Having IOB Value of 1.7 or More to 2.5 or Less As described above, intermittent ejection stability is one of particularly important reliability issues. In addition, it is also important to overcome another problem of an increase in concentration at a beginning portion. The increase in concentration at a beginning portion is defined as a phenomenon caused by a relative increase in the concentration of a dye in an ink present in the vicinity of an ejection orifice of a nozzle due to the evaporation of water in ink present in the nozzle of a recording head. When an image is formed in this state, the image density of a beginning portion (portion where the formation of the image begins) of the image is higher than that of another portion. This is a problem for the formation of a high-quality image.

As described above, the increase in concentration at a beginning portion is caused by the evaporation of water in the ink. Like improvement in intermittent ejection stability due to humidification, it was predicted that the increase in concentration at a beginning portion could be suppressed by humidification. Contrary to this prediction, however, the results of studies by the inventors demonstrated that although the intermittent ejection stability by humidification was improved, the increase in concentration at a beginning portion was not improved. The reason the difference is made is speculated as follows: The direct cause of a reduction in intermittent ejection stability is a local increase in the viscosity of the ink due to the evaporation of water. The increase in concentration at a beginning portion is caused by a local increase in the concentration of the dye in the ink due to the evaporation of water. So, they are attributed to different phenomena. The humidification within a practical range such that condensation is not formed on the recording head suppresses the evaporation of water to the extent that the viscosity of the ink is not increased. However, the humidification does not have the effect of suppressing the increase in the concentration of the dye. As described above, there is a limitation in the suppression of the increase in concentration at a beginning portion by, for example, humidification.

In particular, for the magenta ink in which only the dye of general formula (II) is contained as a coloring material, the increase in concentration at a beginning portion occurred noticeably. The reason for this is speculated as follows: The dye of general formula (II) has relatively high hydrophobicity among dyes to be contained in ink for use in ink jet printing and thus has a high solubility in various water-soluble organic solvents commonly used for ink. The dye has a high solubility in the water-soluble organic solvent even when the content of water in the ink is relatively reduced by the evaporation of water from the ejection orifice. So, the concentration of the dye is relatively increased by a reduction in the amount of water, thereby increasing the concentration of the dye in the first droplet.

In the case of a magenta ink in which only a dye having relatively high hydrophilicity instead of the dye of general formula (II) is contained as a coloring material, the dye has a low solubility in various water-soluble organic solvent commonly used in ink. So, the dye is no longer dissolved in a portion of the ink where the content of water is relatively reduced due to the evaporation of water from the ejection orifice. The dye moves toward the backside of the nozzle (the direction opposite to the ejection orifice). This suppresses the increase in the concentration of the dye in the first ink droplet ejected. In this case, however, the concentration of the dye in the first ink droplet ejected is reduced. In addition, although the concentration of the dye in the second ink droplet ejected is increased to a level, the level is lower than the concentration in the first droplet of the ink containing the dye of general formula (II). As a result, the increase in concentration at a beginning portion of an image is still caused.

So, the inventors have conducted studies and have found that the use of an ink containing a dye having relatively high hydrophilicity and a water-soluble organic compound having relatively high hydrophobicity in addition to the dye, having relatively high hydrophobicity, of general formula (II) suppresses the increase in concentration at a beginning portion of an image. The reason for this is presumably that in the case of the ink containing these components, the concentrations of the dyes in the first ink droplet and the second ink droplet are both increased, so that the difference in image density at a beginning portion of a formed image is unremarkable.

The inventors have paid attention to the ratio of an inorganic value and an organic value, i.e., an inorganic-organic balance (IOB, inorganic value/organic value), based on the theory of an organic conceptual diagram, the IOB value serving as an index of the properties of an organic compound. The organic conceptual diagram is a diagram in which properties of an organic compound are divided into the organic value that indicates covalency and the inorganic value that indicates ionicity and in which they are plotted on rectangular coordinates with the organic axis (horizontal axis) and the inorganic axis (vertical axis). The organic value is substantially equal to the product of the number of carbon atoms of a compound and 20. The inorganic value is defined as the sum of inorganic values intrinsic to groups.

In reference 1 (Yosio Koda. "Yuki Gainen Zu-Kiso to Oyo-" ("Organic Conceptual Diagram, Foundation and Application"); Sankyo Shuppan, 1984), the inorganic values of about 80 groups are determined to date; for example, the inorganic value of a hydroxy group is defined as 100. Reference 2 (Ryohei Oda. "Teijin Taimusu" ("Teijin Times"), 22(9), 10-4 (1952)) describes the following: The organic nature in the organic conceptual diagram corresponds to the lipophilicity (i.e., hydrophobicity) of a surfactant. So, the ratio of the inorganic nature to the organic nature calculated on the basis of the chemical structure of a surfactant has the same meaning as the hydrophile-lipophile balance (HLB) of the surfactant. Conversely, the IOB value can be regarded as an index that indicates the hydrophobicity of an organic compound.

As described above, the use of the ink containing a dye having relatively high hydrophilicity and a water-soluble organic compound having relatively high hydrophobicity in addition to the dye, having relatively high hydrophobicity, of general formula (II) suppresses the increase in concentration at a beginning portion of an image. The degree of hydrophobicity of the water-soluble organic compound can be determined by the IOB value. The inventors have paid attention to the dye having relatively high hydrophilicity and the water-soluble organic compound having relatively high hydrophobicity and have conducted studies of ranges of their IOB values. Thus, the inventors have found that an ink containing a magenta dye having an IOB value of 2.0 or more and a water-soluble organic compound having an IOB value of 1.7 or more to 2.5 or less in addition to the dye of general formula (II) is appropriately used.

Note that the relationship between the dye and the water-soluble organic compound in terms of the solubility of the dye in the water-soluble organic compound is not yet clear. However, results from studies by the inventors at least demonstrate that a dye having an IOB value of 1.5 to 1.8 is well soluble in a water-soluble organic compound having an IOB value of 1.4 to 5.0 and that a dye having an IOB value of 2.0 or more is less soluble in a water-soluble organic compound having an IOB value of 2.5 or less.

Magenta Dye Having IOB Value of 2.0 or More

The magenta ink can contain a magenta dye having an IOB value of 2.0 or more. The upper limit of the IOB value can be 3.0 or less. The content (% by mass) of the magenta dye having an IOB value of 2.0 or more in the magenta ink can be in the range of 1.0% by mass or more to 5.0% by mass or less with respect to the total mass of the ink. A content of less than 1.0% can fail to sufficiently suppress the increase in the concentration at a beginning portion. At a content of more than 5.0% by mass, after a state is continued in which the ink is not ejected from an ejection orifice of a recording head for a certain period of time, the concentration of the dye in the second ink droplet ejected is higher than that in the first ink droplet, thereby failing to sufficiently suppress the increase in the concentration at a beginning portion, in some cases.

Examples of the magenta dye having an IOB value of 2.0 or more can include dyes represented by general formulae (III), (IV), and (V). In aspects of the present invention, among these magenta dyes each having an IOB value of 2.0 or more, the dye represented by general formula (III) described below can be used because the increase in concentration at a beginning portion is markedly suppressed:

general formula (III)

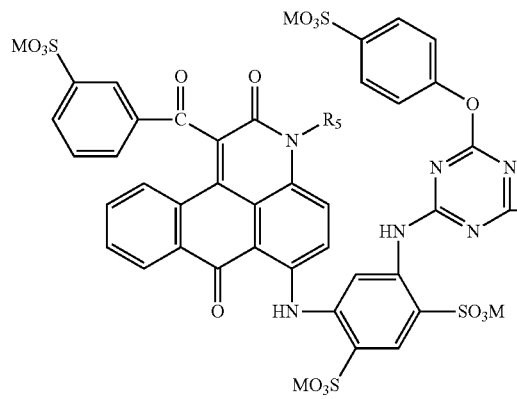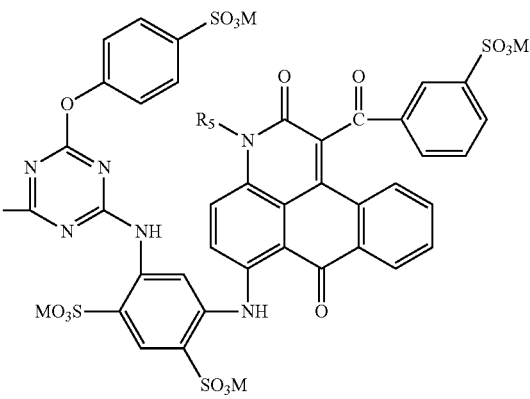

wherein the dye represented by general formula (III) has an IOB value of 2.0 or more; $R_5$'s each independently represent a hydrogen atom, an alkyl group, a hydroxyalkyl group, a cyclohexyl group, a monoalkylaminoalkyl group, or a dialkylaminoalkyl group; M's each independently represent a hydrogen atom, an alkali metal, ammonium, or organic ammonium; and $R_6$ represents a linking group.

In general formula (III), in the case where each $R_5$ represents a group having a carbon atom, the number of carbon atoms may be in the range of 1 to 8, such as 1 to 4. In general formula (III), $R_6$ represents a linking group having a structure, for example, *—NH—$(CH_2)_n$—NH—* (n represents 2 to 8, such as 2 to 6, and even 2; and *'s represent linking sites to be linked with two different triazine rings). In general formula (III), M's each independently represent an alkali metal, ammonium, or organic ammonium. Examples of the alkali metal include lithium, sodium, and potassium. Examples of the organic ammonium include acetamide, benzamide, methylamino, butylamino, diethylamino, and phenylamino.

wherein a dye represented by general formula (V) has an IOB value of 2.0 or more; $R_8$, $R_9$, and $R_{10}$ each independently represent an alkyl group, an alkoxy group, a halogen atom, a hydrogen atom, a hydroxy group, a carbamoyl group, a sulfamoyl group, an amino group, a nitro group, a sulfonic ester group, a carboxy group, or a carboxylate group; $R_{11}$, $R_{12}$, and $R_{13}$ each independently represent a hydrogen atom, an alkyl group, an alkenyl group, an aryl group, an aralkyl group, an aromatic group, or a heterocyclic group; e represents an integer of 0 to 3; and M's each independently represent a hydrogen atom, an alkali metal, ammonium, or organic ammonium.

In general formula (V), in the case where each of $R_8$, $R_9$, $R_{10}$, $R_{11}$, $R_{12}$, and $R_{13}$ represents a group having a carbon atom, the number of carbon atoms may be in the range of 1 to 8, such as 1 to 4. In general formula (V), M's each indepengeneral formula (IV)

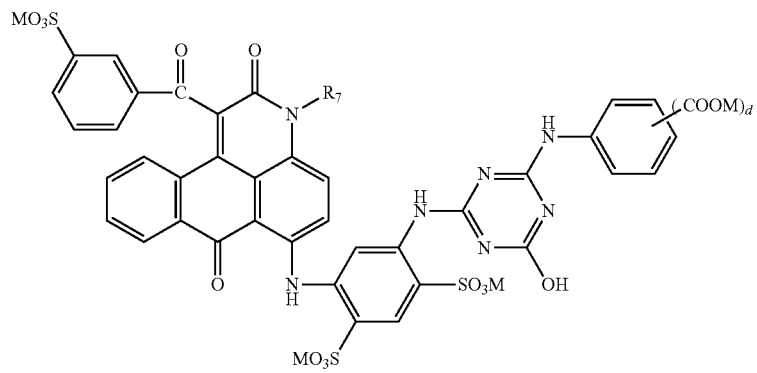

wherein a dye represented by general formula (IV) has an IOB value of 2.0 or more; $R_7$ represents a hydrogen atom or an alkyl group; d represents an integer of 1 to 3; and M's each independently represent a hydrogen atom, an alkali metal, ammonium, or organic ammonium.

In general formula (IV), $R_7$ represents a hydrogen atom or an alkyl group. The number of carbon atoms in the alkyl group may be in the range of 1 to 8, such as preferably 1 to 4. In general formula (IV), M's each independently represent a hydrogen atom, an alkali metal, ammonium, or organic ammonium. Examples of the alkali metal include lithium, sodium, and potassium. Examples of the organic ammonium include acetamide, benzamide, methylamino, butylamino, diethylamino, and phenylamino.

dently represent a hydrogen atom, an alkali metal, ammonium, or organic ammonium. Examples of the alkali metal include lithium, sodium, and potassium. Examples of the organic ammonium include acetamide, benzamide, methylamino, butylamino, diethylamino, and phenylamino.

general formula (V)

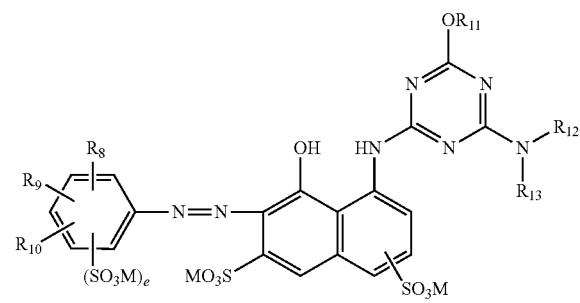

A specific example of the dye represented by general formula (III) is exemplified compound M3 described below. A specific example of the dye represented by general formula (IV) is exemplified compound M4 described below. A specific example of the dye represented by general formula (V) is exemplified compound M5 described below. Note that the following exemplified compounds are described in the form of a free acid. These dyes according to aspects of the present invention are not limited to the exemplified compounds described below as long as they have structures included in the structures of general formulae (III), (IV), and (V) and they are included in the definition thereof.

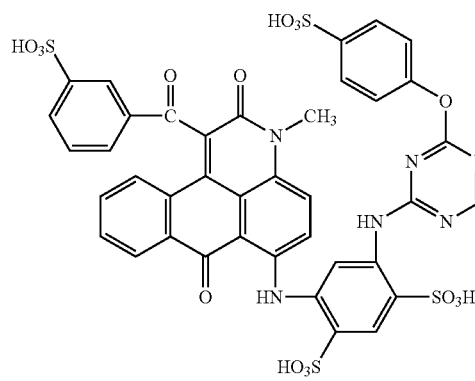
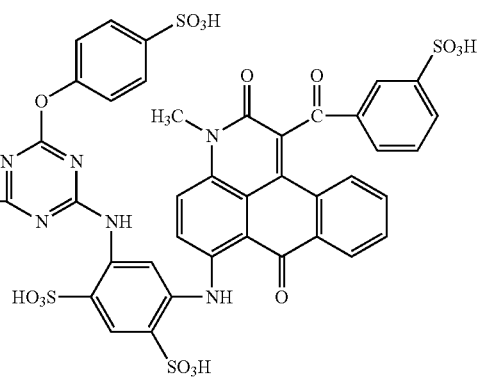

exemplified compound M3 (IOB value = 2.4)

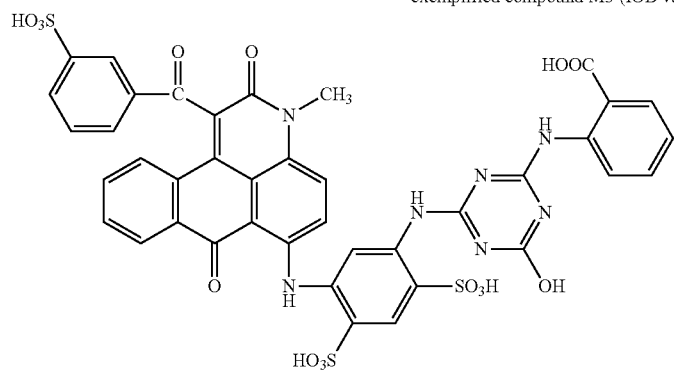

exemplified compound M4 (IOB value = 2.2)

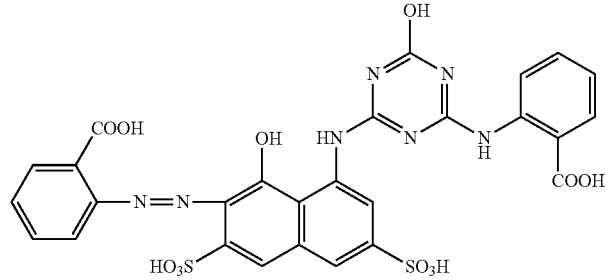

exemplified compound M5 (IOB value = = 2.8)

Water-Soluble Organic Compound Having IOB Value of 1.7 or More to 2.5 or Less

The magenta ink can contain the magenta dye having an IOB value of 2.0 or more in combination with the water-soluble organic compound having an IOB value of 1.7 or more to 2.5 or less, as described above. An IOB value of the water-soluble organic compound of less than 1.7 can lead to the precipitation of the high-hydrophilic dye having an IOB value of 2.0 or more at the tip of a nozzle because of excessively high hydrophobicity of the water-soluble organic compound, thereby failing to sufficiently providing the effect of suppressing the increase in concentration at a beginning portion using the dye. An IOB value of more than 2.5 can lead to insufficient suppression of the increase in the concentration at a beginning portion. In this aspect of the present invention, the foregoing effect is provided as long as the magenta ink contains the water-soluble organic compound having an IOB value of 1.7 or more to 2.5 or less. Thus, the magenta ink may further contain a water-soluble organic compound having an IOB value of less than 1.7 or more than 2.5.

Examples of the water-soluble organic compound which has an IOB value of 1.7 or more to 2.5 or less and which can be contained in the magenta ink used in aspects of the present invention are described below, and each of the numbers in parentheses represents the IOB value. Examples thereof include 1,4-butanediol (2.5), 1,5-pentanediol (2.0), 2-pyrrolidone (1.8), 3-methyl-1,5-pentanediol (1.8), 1,2-hexanediol (1.7), and 1,6-hexanediol (1.7). They may be contained in the ink separately or in combination. In aspects of the present invention, the water-soluble organic compound is not limited to the foregoing compounds. Any water-soluble organic compound may be used without limitation as long as it has an IOB value within the range described above. In aspects of the present invention, among these water-soluble organic compounds, 1,5-pentanediol can be used.

In aspects of the present invention, letting the content of the magenta dye having an IOB value of 2.0 or more in the magenta ink be A (% by mass), and letting the content of the water-soluble organic compound having an IOB value of 1.7 or more to 2.5 or less be B (% by mass), the following relationship can be satisfied. The mass ratio (B/A) of the content B (% by mass) of the water-soluble organic compound having an IOB value of 1.7 or more to 2.5 or less to the content A (% by mass) of the dye represented by general formula (II), i.e., B/A, may be in the range of 0.5 times or more to 15.0 times or less, such as 1.0 time or more to 10.0 times or less with respect to the total mass of the ink. A mass ratio of less than 0.5 times can lead to the insufficient effect of suppressing the increase in the concentration at a beginning portion. A mass ratio of more than 15.0 times can lead to insufficient intermittent ejection stability because of the excessively high viscosity of the ink.

In aspects of the present invention, our attention is focused on the affinity between the dye and the water-soluble organic compound. So, the term "the water-soluble organic compound" having an IOB value, which is determined by calculation, does not include coloring materials, such as dyes and pigments, and additives as described below.

Aqueous Medium

Each ink may contain an aqueous medium, which is a mixed solvent of water and a water-soluble organic solvent. The magenta ink may further contain the foregoing water-soluble organic compound having an IOB value within the specific range. Deionized water and ion-exchanged water can be used as water. The content (% by mass) of water in the ink can be in the range of 50.0% by mass or more to 95.0% by mass or less with respect to the total mass of the ink. Examples of the water-soluble organic solvent include monohydric and polyhydric alcohols, glycols, glycol ethers, and nitrogen-containing compounds, which can be used for ink for use in ink jet printing. These compounds may be contained in the ink separately or in combination. The content (% by mass) of the water-soluble organic solvent in the ink can be in the range of 2.0% by mass or more to 50.0% or less by mass with respect to the total mass of the ink. In this case, the content of the water-soluble organic solvent includes the content of the water-soluble organic compound having an IOB value within the specific range.

Additional Additive

Each ink used in aspects of the present invention may contain a solid water-soluble organic compound at room temperature, for example, urea, its derivative, or polyhydric alcohol, e.g., trimethylolpropane or trimethylolethane. Furthermore, the ink may optionally contain various additives in addition to the components described above. Examples of the additives include surfactants, pH adjusting agents, rust-preventive agents, preservatives, fungicides, antioxidants, anti-reducing agents, evaporation accelerators, chelating agents, and water-soluble polymers.

Additional Ink

In aspects of the present invention, as the ink used in the image formation step, at least the cyan ink and the magenta ink described above are used. Furthermore, an additional type of ink may be used. Examples of the additional type of ink include yellow, black, red, green, and blue inks. Moreover, inks having the same hues but different concentrations from these inks and clear inks, which do not contain a coloring material, may be used.

Humidification Step

An aspect of the present invention includes the foregoing image formation step and a humidification step of humidifying a gap between a recording head and a recording medium. The humidification step may be performed to the extent that the ink-receiving layer of the recording medium sufficiently absorbs water. An example of a humidification method is a method in which humidified air is fed into the gap between the recording head and the recording medium. In aspects of the present invention, the humidification step is performed by supplying humidified air into the gap between the recording head and the recording medium. The humidification step can be performed in such a manner that the gap between the recording head and the recording medium is filled with an atmosphere having a temperature of 35° C. or lower and an absolute humidity of 0.013 kg/kgDA or higher. Here, the term "absolute humidity" used aspects of the present invention indicates an absolute humidity on a weight basis, i.e., the weight (kg) of water vapor contained in humidified air with respect to the weight (kg) of dry air as expressed by the unit kg/kgDA. The lower limit of the temperature can be 15° C. or higher. As a precondition, the relative humidity can be lower than 100%. With respect to the humidification conditions, the atmosphere can have a temperature of 15° C. or higher to 35° C. or lower and an absolute humidity of 0.015 kg/kgDA or higher and even 0.017 kg/kgDA or higher. In this case, the effect of improving the intermittent ejection stability by humidification is high, and the relative humidity is lower than 100% in this temperature range. Thus, no condensation occurs on the recording head, providing excellent ejection stability.

Aspects of the present invention, in addition to the humidification step described above, a prehumidification step of humidifying a recording medium can be performed before the image formation step. In this step, the recording medium is humidified before the recording medium is conveyed to an image forming portion including the recording head. The intermittent ejection stability is more effectively improved by performing this prehumidification step. The reason for this is as follows: The prehumidification step allows the recording medium to sufficiently absorb water before the recording medium is conveyed to the image forming portion. This makes it possible to effectively humidify the gap between the recording head and the recording medium. In aspects of the present invention, the prehumidification step is performed by supplying humidified air before the recording medium is conveyed to the image forming portion including the recording head. The prehumidification step can be performed in an atmosphere having a temperature of 35° C. or lower and an absolute humidity of 0.013 kg/kgDA or higher.

Ink Jet Recording Apparatus

An ink jet recording apparatus according to aspects of the present invention includes a plurality of ink storage portions configured to store a plurality of inks, an image forming portion configured to form an image on a recording medium having an ink-receiving layer by ejecting an ink from an ink jet recording head, and a unit configured to humidify a gap between the recording head and the recording medium, in which the plural inks stored in the plural ink storage portions include the cyan ink and the magenta ink described above.

The structure of the ink jet recording apparatus according to aspects of the present invention will be described below. FIGURE is a schematic diagram of an exemplary image forming portion 1 of the ink jet recording apparatus used in the ink jet recording method according to aspects of the present invention. The illustration of the entire structure of the recording apparatus is omitted. A paper feeding unit, the image forming portion 1, a cutting unit, a drying unit, the ink storage portions, a control unit, and a paper ejecting section are arranged from the upstream side to the downstream side of the conveying direction of the recording medium. The paper feeding unit rotatably holds a recording medium 2 wound in the form of a roll. The image forming portion 1 includes a plurality of recording heads 1a corresponding to inks of different colors. Here, four recording heads corresponding to the four inks are arranged. However, the number of inks is not limited to four. Each of the inks is fed from the ink storage portions to a corresponding one of the recording heads 1a through ink tubes. Each of the plural recording heads 1a is a line-type recording head provided with an ink jet nozzle array that covers the maximum width of the recording medium to be used.

Unlike a serial-type recording head in which a recording medium is conveyed in a sub-scanning direction with the recording head scanned reciprocally in a main scanning direction to form an image, in the case of the line-type recording head, the recording head is not scanned reciprocally. So, the line-type recording head has a significant advantage in terms of recording rate over the serial-type recording head. However, from the viewpoint of solving the foregoing problem of the increase in the concentration at a beginning portion, the line-type recording head is disadvantageous compared with the serial-type recording head. The reason for this is as follows: For the serial-type recording head, because reciprocal scanning is performed, what is called preliminary ejection of ink having a relatively increased dye concentration is performed at a position different from a position corresponding to the recording medium even during a recording operation, thereby suppressing the increase in the concentration at a beginning portion. However, the line-type recording head is always located at a position corresponding to a recording region. So, it is difficult to perform the preliminary ejection as described above. Even when the line-type recording head is used, the use of the magenta ink containing the dye and the water-soluble organic compound described above effectively suppresses the increase in the concentration at a beginning portion.

In the image forming portion 1, a recording medium conveying path is arranged transversely and faces the recording heads 1a. A conveying mechanism configured to convey the recording medium is arranged along the recording medium conveying path. The plural recording heads 1a and the conveying mechanism are arranged in a substantially enclosed space in a housing 1b. A second humidifying unit 1d configured to humidify the gap between the recording heads 1a and the recording medium is arranged in the image forming portion 1 and supplies humidified air into the gap between the recording heads 1a and the recording medium (i.e., paper-head distance). The humidified air may be fed not only into the gap between the recording heads 1a and the recording medium but also into the whole of the substantially enclosed space in the housing 1b to fill the whole of the space with an atmosphere that satisfies predetermined temperature and humidity conditions. Furthermore, a first humidifying unit 1c configured to preliminarily humidify the recording medium before the recording medium is conveyed to the image forming portion including the recording heads may be arranged on the upstream side of the recording heads 1a in the conveying direction.

The cutting unit is configured to cut the recording medium, on which an image has been formed at the image forming portion 1, into a predetermined size. The cutter unit includes a cutting mechanism. The drying unit is configured to dry the cut recording medium in a short time. The drying unit includes a hot-blast device provided with a heater configured to heat a gas and a fan configured to generate the flow of the heated gas, and a plurality of conveying rollers arranged along the recording medium conveying path. The paper ejecting section is configured to accommodate the cut recording medium ejected from the drying unit. A plurality of pieces of the recording medium are stacked therein. The control unit serves as a controller responsible for controlling and driving the entire recording apparatus.

Note that the predetermined temperature and humidity conditions described above can be achieved without performing the humidification step, depending on an environment where the ink jet recording apparatus is placed. However, the temperature and humidity in the outside environment are always changed. So, the predetermined temperature and humidity conditions are not always satisfied. Accordingly, the achievement of the temperature and humidity conditions, which are set in the aspects of the present invention, by performing the humidification step remains effective in providing the advantages of aspects of the present invention.

EXAMPLES

While the present invention will be described in more detail below by way of Examples and Comparative Examples, the present invention is not limited to the following Examples.

Preparation of Ink

Components (unit: % by mass) shown in Tables 2 to 4 described below were mixed and sufficiently stirred to dissolve the components. The resulting solution was filtered under pressure with a microfilter (manufactured by Fujifilm Corporation) having a pore size of 0.2 µm to prepare cyan and magenta inks. Acetylenol E100 is a nonionic surfactant manufactured by Kawaken Fine Chemicals Co., Ltd. Note that for the components of the magenta inks shown in Tables 3 and 4, each of the numbers in parentheses represents the IOB value.

As exemplified compound C1, a compound synthesized on the basis of Examples described in International Publication No. WO2007/091631 was used. Note that dyes of general formula (I) are all mixtures. The mixtures of isomers and so forth are referred to as "dyes". That is, the dyes include, for example, regioisomers of compounds, regioisomers in terms of the position of the nitrogen atom in a pyridine ring, isomers having different ratios of benzo rings to nitrogen-containing heteroaromatic rings represented by A, B, C and D in general formula (I), and $\alpha/\beta$ regioisomers of a substituted or unsubstituted sulfamoyl group in a benzo ring. As a comparative compound, compound 154 synthesized on the basis of Examples described in Japanese Patent Laid-Open No. 2003-231834 was used.

As exemplified compounds M1 and M2, compounds synthesized on the basis of Examples described in Japanese Patent Laid-Open No. 2006-143989 were used. As exemplified compound M5, a compound synthesized on the basis of Examples described in Japanese Patent Laid-Open No. 8-073791 was used. As exemplified compound M3, a compound synthesized on the basis of Examples described in International Publication No. WO2008/066062 was used. As exemplified compound M4, a compound synthesized on the basis of Examples described in International Publication No. WO2004/104108 was used. As reference compound (magenta dye having an IOB value of 1.2), a compound of formula (1) synthesized on the basis of Examples described in Japanese Patent Laid-Open No. 2000-169776 was used.

TABLE 2

| Composition of cyan ink | | | |
|---|---|---|---|
| | Cyan ink No. | | |
| | 1 | 2 | 3 |
| Exemplified compound C1 | 4.0 | | |
| C.I. Acid Blue 9 | | 4.0 | |
| Comparative compound | | | 4.0 |
| Glycerol | 15.0 | 15.0 | 15.0 |
| Triethylene glycol | 5.0 | 5.0 | 5.0 |

TABLE 2-continued

Composition of cyan ink

| | Cyan ink No. | | |
|---|---|---|---|
| | 1 | 2 | 3 |
| Acetylenol E100 | 0.4 | 0.4 | 0.4 |
| Water | 75.6 | 75.6 | 75.6 |

TABLE 3

Composition of magenta ink

| | Magenta ink No. | | | | | | | | | |
|---|---|---|---|---|---|---|---|---|---|---|
| | 1 | 2 | 3 | 4 | 5 | 6 | 7 | 8 | 9 | 10 |
| Exemplified compound M1 (1.8) | 1.4 | 1.5 | 2.3 | 5.0 | 5.1 | | | | | |
| Exemplified compound M2 (1.7) | | | | | | 2.3 | 2.3 | 2.3 | 2.3 | 2.3 |
| Exemplified compound M5 (2.8) | | | | | | | 3.5 | | | |
| Exemplified compound M3 (2.4) | | | | | | | | 3.5 | | |
| Exemplified compound M4 (2.2) | | | | | | | | | 3.5 | |
| Reference compound (1.2) | | | | | | | | | | 3.5 |
| Glycerol (5.0) | 15.0 | 15.0 | 15.0 | 15.0 | 15.0 | 15.0 | 15.0 | 15.0 | 15.0 | 15.0 |
| Triethylene glycol (2.7) | 5.0 | 5.0 | 5.0 | 5.0 | 5.0 | 5.0 | | | | |
| 1,4-Butanediol (2.5) | | | | | | | 5.0 | 5.0 | 5.0 | 5.0 |
| 1,5-Pentanediol (2.0) | | | | | | | | | | |
| 2-Pyrrolidone (1.8) | | | | | | | | | | |
| 1,6-Hexanediol (1.7) | | | | | | | | | | |
| Triethylene glycol monobutyl ether (1.4) | | | | | | | | | | |
| Acetylenol E100 | 0.7 | 0.7 | 0.7 | 0.7 | 0.7 | 0.7 | 0.7 | 0.7 | 0.7 | 0.7 |
| Water | 77.9 | 77.8 | 77.0 | 74.3 | 74.2 | 77.0 | 73.5 | 73.5 | 73.5 | 73.5 |

TABLE 4

Composition of magenta ink

| | Magenta ink No. | | | | | | | | |
|---|---|---|---|---|---|---|---|---|---|
| | 11 | 12 | 13 | 14 | 15 | 16 | 17 | 18 | 19 |
| Exemplified compound M1 (1.8) | | | | | | | | | |
| Exemplified compound M2 (1.7) | 2.3 | 2.3 | 2.3 | 2.3 | 2.3 | 2.3 | | | |
| Exemplified compound M5 (2.8) | 3.5 | 3.5 | 3.5 | 3.5 | 3.5 | | 1.4 | | |
| Exemplified compound M3 (2.4) | | | | | | 3.5 | | 1.4 | |
| Exemplified compound M4 (2.2) | | | | | | | | | |
| Reference compound (1.2) | | | | | | | | | 1.4 |
| Glycerol (5.0) | 15.0 | 15.0 | 15.0 | 15.0 | 15.0 | 15.0 | 15.0 | 15.0 | 15.0 |
| Triethylene glycol (2.7) | 5.0 | | | | | | 5.0 | 5.0 | 5.0 |
| 1,4-Butanediol (2.5) | | | | | | | | | |
| 1,5-Pentanediol (2.0) | | 5.0 | | | | 5.0 | | | |
| 2-Pyrrolidone (1.8) | | | 5.0 | | | | | | |
| 1,6-Hexanediol (1.7) | | | | 5.0 | | | | | |
| Triethylene glycol monobutyl ether (1.4) | | | | | 5.0 | | | | |
| Acetylenol E100 | 0.7 | 0.7 | 0.7 | 0.7 | 0.7 | 0.7 | 0.7 | 0.7 | 0.7 |
| Water | 73.5 | 73.5 | 73.5 | 73.5 | 73.5 | 73.5 | 77.9 | 77.9 | 77.9 |

Evaluation

Intermittent Ejection Stability of Cyan Ink

The rate (%) of decrease in ejection velocity when each of the cyan inks shown in Table 5 was ejected at nonejection intervals of 6 seconds was determined with respect to an ejection velocity when each of the cyan inks was ejected at nonejection intervals of 0.3 msec. The intermittent ejection stability was evaluated on the basis of the rate of decrease. The ejection velocity of the ink was determined as follows: Regarding ink droplets ejected from the recording head, ejection was synchronized with light emission from an electronic flash-type observation system. The ejection velocity was calculated on the basis of the moving distance of an ink droplet from 5 μsec to 30 μsec after ejection. Evaluation criteria are described below. Table 5 shows the results. In aspects of the present invention, according to the following evaluation criteria, grade B or higher was defined as an acceptable level, and grade C or lower was defined as an unacceptable level.

An ink jet recording apparatus was used which included the image forming portion illustrated in FIGURE. Specifically, the apparatus included a recording head configured to eject ink by the application of thermal energy, and a humidifying unit (second humidifying unit in FIGURE) configured to supply humidified air into a gap between a recording head and a recording medium at the time of image formation. Recording conditions were set as follows: volume per ink droplet: 2.8 pL, resolution: 2400 dpi×1200 dpi, and the number of arrays of nozzles: 8. An image formed under conditions in which eight ink droplets each having a volume of 2.8 pL were applied to a 1/600 inch×1/600 inch unit region was defined as an image with a recording duty of 100%.

AA: The rate of decrease in ejection velocity was less than 30%.

A: The rate of decrease in ejection velocity was 30% or more and less than 40%.
B: The rate of decrease in ejection velocity was 40% or more and less than 50%.
C: The rate of decrease in ejection velocity was 50% or more.

Bronzing Resistance of Secondary Color Image

Blue images were each formed on a recording medium (trade name: Canon Photo Paper-Gloss Gold GL-101, manufactured by CANON KABUSHIKI KAISHA) including an ink-receiving layer using cyan and magenta inks shown in Table 5. The images were secondary color images formed under the same ratio of the amount of the cyan ink to the amount of the magenta ink applied, the images having 16 different recording duties between 10% and 160% in steps of 10%. An ink jet recording apparatus and recording conditions used were the same as those in the foregoing evaluation of the intermittent ejection stability. An image formed under conditions in which a total of eight droplets of the cyan and magenta inks, each droplet having a volume of 2.8 pL, were applied to a 1/600 inch×1/600 inch unit region was defined as a secondary color image with a recording duty of 100%.

With respect to the resulting evaluation samples, the image in which the bronzing phenomenon occurred was visually identified. The recording duty of the image was defined as recording duty at which the bronzing phenomenon occurred. The evaluation of the bronzing resistance of each secondary color image was made on the basis of the recording duty. Here, a higher recording duty at which the bronzing phenomenon occurred indicates the ink having higher bronzing resistance. Evaluation criteria were described below. Table 5 shows the results. In aspects of the present invention, according to the following evaluation criteria, grade B or higher was defined as an acceptable level, and grade C or lower was defined as an unacceptable level.

AA: The recording duty at which the bronzing phenomenon occurred was 160% or more.
A: The recording duty at which the bronzing phenomenon occurred was 150% or more and less than 160%.
B: The recording duty at which the bronzing phenomenon occurred was 140% or more and less than 150%.
C: The recording duty at which the bronzing phenomenon occurred was less than 140%.

Ozone Resistance of Secondary Color Image

Evaluation samples were produced using the cyan and magenta inks shown in Table 5 in the same way as the foregoing samples for the evaluation of bronzing resistance. The image density of a portion of an image with a recording duty of 50% of the evaluation sample was measured (the resulting image density was defined as "image density $d_1$ before an ozone resistance test"). This evaluation sample was subjected to ozone exposure with an ozone testing apparatus (trade name: OMS-H, manufactured by Suga Test Instruments Co., Ltd.) at an ozone gas concentration of 10 ppm, a relative humidity of 60%, and a temperature in a chamber of 23° C. for 5 hours. Then the image density of the portion of the image with a recording duty of 50% of the ozone-exposed evaluation sample was measured (the resulting image density was defined as "image density $d_2$ after the ozone resistance test"). The image density was measured with a spectrophotometer (trade name: Spectrolino, manufactured by Gretag-Macbeth) using a light source (D50) at a view angle of 2° and was defined as the average optical density of a cyan component and a magenta component. A residual image density (%) was calculated from the expression $d_2/d_1 \times 100$ using the resulting $d_1$ and $d_2$ to evaluate the ozone resistance of the secondary color image. Evaluation criteria were described below. Table 5 shows the results. In aspects of the present invention, according to the following evaluation criteria, grade A or higher was defined as an acceptable level, and grade B or lower was defined as an unacceptable level.

A: The residual image density was 90% or more.
B: The residual image density was 80% or more and less than 90%.
C: The residual image density was less than 80%.

Suppression of Increase in Concentration of Magenta Ink at Beginning Portion

After 100 droplets of each of the magenta inks shown in Table 5 were ejected at nonejection intervals of 0.3 msec, solid images each having a recording duty of 25% were recorded at nonejection intervals of 6 seconds. An ink jet recording apparatus, recording conditions, and the definition of the recording duty used were the same as those in the evaluation of the intermittent ejection stability. A recording medium used was the same as that in the evaluation of the bronzing resistance. The resulting evaluation samples were visually checked to evaluate the suppression of the increase in the concentration of the magenta ink at a beginning portion. Evaluation criteria were described below. Table 5 shows the results. In aspects of the present invention, according to the following evaluation criteria, grade B or higher was defined as an acceptable level, and grade C was defined as an unacceptable level.

AAA: The concentration at a beginning of the image was not increased.
AA: The concentration at a beginning of the image was very slightly increased.
A: The concentration at a beginning of the image was slightly increased.
B: The concentration at a beginning of the image was increased.
C: The concentration at a beginning of the image was significantly increased.

TABLE 5

Evaluation conditions and evaluation results

| | | Evaluation conditions | | | | | Evaluation results | | | |
|---|---|---|---|---|---|---|---|---|---|---|
| | | Cyan ink No. | Magenta ink No. | Humidification step | Humidification temperature [° C.] | Absolute humidity [kg/kgDA] | Intermittent ejection stability of cyan ink | Bronzing resistance of secondary color image | Ozone resistance of secondary color image | Suppression of increase in concentration of magenta ink at beginning portion |
| Example | 1 | 1 | 1 | performed | 35 | 0.015 | AA | B | A | B |
| | 2 | 1 | 2 | performed | 35 | 0.015 | AA | A | A | B |
| | 3 | 1 | 3 | performed | 35 | 0.015 | AA | A | A | B |
| | 4 | 1 | 4 | performed | 35 | 0.015 | AA | A | A | B |

TABLE 5-continued

Evaluation conditions and evaluation results

|  | | Cyan ink No. | Magenta ink No. | Evaluation conditions | | | | Evaluation results | | | |
|---|---|---|---|---|---|---|---|---|---|---|---|
|  | | | | Humidification step | Humidification temperature [° C.] | Absolute humidity [kg/kgDA] | | Intermittent ejection stability of cyan ink | Bronzing resistance of secondary color image | Ozone resistance of secondary color image | Suppression of increase in concentration of magenta ink at beginning portion |
|  | 5 | 1 | 5 | performed | 35 | 0.015 | | AA | B | A | B |
|  | 6 | 1 | 6 | performed | 35 | 0.015 | | AA | AA | A | B |
|  | 7 | 1 | 7 | performed | 35 | 0.015 | | AA | AA | A | A |
|  | 8 | 1 | 8 | performed | 35 | 0.015 | | AA | AA | A | AA |
|  | 9 | 1 | 9 | performed | 35 | 0.015 | | AA | AA | A | A |
|  | 10 | 1 | 10 | performed | 35 | 0.015 | | AA | AA | A | B |
|  | 11 | 1 | 11 | performed | 35 | 0.015 | | AA | AA | A | B |
|  | 12 | 1 | 12 | performed | 35 | 0.015 | | AA | AA | A | AA |
|  | 13 | 1 | 13 | performed | 35 | 0.015 | | AA | AA | A | A |
|  | 14 | 1 | 14 | performed | 35 | 0.015 | | AA | AA | A | A |
|  | 15 | 1 | 15 | performed | 35 | 0.015 | | AA | AA | A | B |
|  | 16 | 1 | 16 | performed | 35 | 0.015 | | AA | AA | A | AAA |
|  | 17 | 1 | 16 | performed | 40 | 0.015 | | A | AA | A | AAA |
|  | 18 | 1 | 16 | performed | 35 | 0.013 | | A | AA | A | AAA |
|  | 19 | 1 | 16 | performed | 40 | 0.010 | | B | AA | A | AAA |
| Comparative | 1 | 2 | 1 | performed | 35 | 0.015 | | AA | AA | C | B |
| Example | 2 | 3 | 1 | performed | 35 | 0.015 | | AA | A | B | B |
|  | 3 | 1 | 17 | performed | 35 | 0.015 | | AA | C | B | B |
|  | 4 | 1 | 18 | performed | 35 | 0.015 | | AA | C | A | B |
|  | 5 | 1 | 18 | not performed | — | — | | C | AA | A | B |
|  | 6 | 1 | 19 | performed | 35 | 0.015 | | AA | C | A | B |
|  | 7 | 1 | 1 | not performed | — | — | | C | AA | A | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-141941 filed Jun. 22, 2010, which is hereby incorporated by reference herein in its entirety.

What is claimed is:
1. An ink jet recording method comprising:
an image formation step of forming an image on a recording medium having an ink-receiving layer by ejecting an ink from an ink jet recording head; and
a humidification step of humidifying a gap between the recording head and the recording medium,
wherein in the image formation step, at least a cyan ink containing a dye represented by general formula (I) and a magenta ink containing a dye represented by general formula (II) are used:

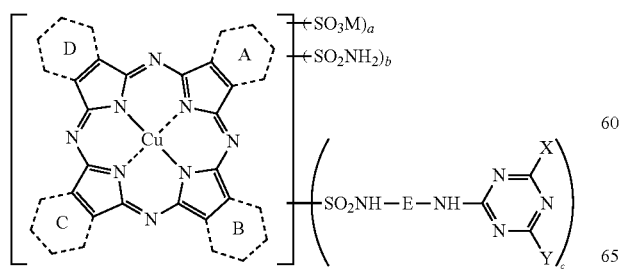

general formula (I)

wherein in general formula (I), A, B, C, and D each independently represent a six-membered ring having aromaticity, and at least one of A, B, C, and D represents a pyridine ring or a pyrazine ring; M's each independently represents a hydrogen atom, an alkali metal, ammonium, or organic ammonium; E represents an alkylene group; X represents a sulfo-substituted anilino group, a carboxy-substituted anilino group, or a phosphono-substituted anilino group, and the substituted anilino group may further contain one to four substituents of at least one type of substituent selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, an ureido group, an alkyl group, a nitro group, a cyano group, a halogen atom, an alkylsulfonyl group, and an alkylthio group; Y represents a hydroxy group or an amino group; and a, b, and c satisfy $0 \leq a \leq 2.0$, $0 \leq b \leq 3.0$, and $0.1 \leq c \leq 3.0$, provided that $a+b+c=1.0$ to $4.0$ and general formula (II)

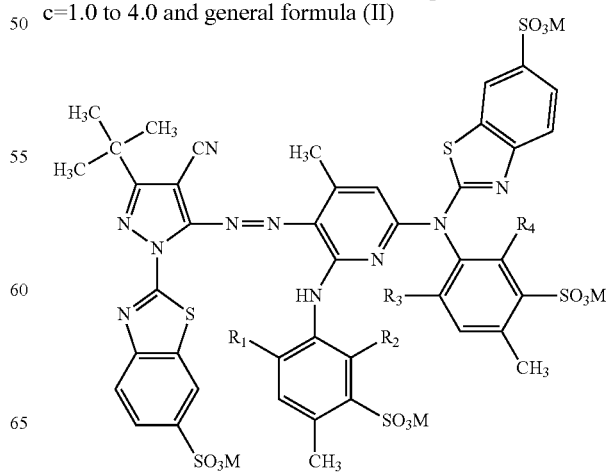

wherein in general formula (II), $R_1$, $R_2$, $R_3$, and $R_4$ each independently represent an alkyl group; and M's each independently represent a hydrogen atom, an alkali metal, ammonium, or organic ammonium.

2. The ink jet recording method according to claim 1, wherein the content (% by mass) of the dye represented by general formula (II) in the magenta ink is in the range of 1.5% by mass or more to 5.0% by mass or less with respect to the total mass of the magenta ink.

3. The ink jet recording method according to claim 1, wherein each of $R_2$, $R_3$, $R_4$, and $R_5$ in general formula (II) represents an ethyl group.

4. The ink jet recording method according to claim 1, wherein the magenta ink further contains a magenta dye having an inorganic-organic balance value of 2.0 or more and a water-soluble organic compound having an inorganic-organic balance value of 1.7 or more to 2.5 or less.

5. The ink jet recording method according to claim 4, wherein the magenta dye having an inorganic-organic balance value of 2.0 or more in the magenta dye is represented by general formula (III):

6. The ink jet recording method according to claim 4, wherein the magenta ink contains 1,5-pentanediol serving as the water-soluble organic compound having an inorganic-organic balance value of 1.7 or more to 2.5 or less.

7. The ink jet recording method according to claim 1, wherein the humidification step is performed by supplying humidified air into the gap between the recording head and the recording medium, and
wherein the gap between the recording head and the recording medium is filled with an atmosphere having a temperature of 35° C. or lower and an absolute humidity of 0.013 kg/kgDA or higher.

8. An ink jet recording apparatus comprising:
a plurality of ink storage portions configured to store a plurality of inks;
an image forming portion configured to form an image on a recording medium having an ink-receiving layer by ejecting an ink from an ink jet recording head; and

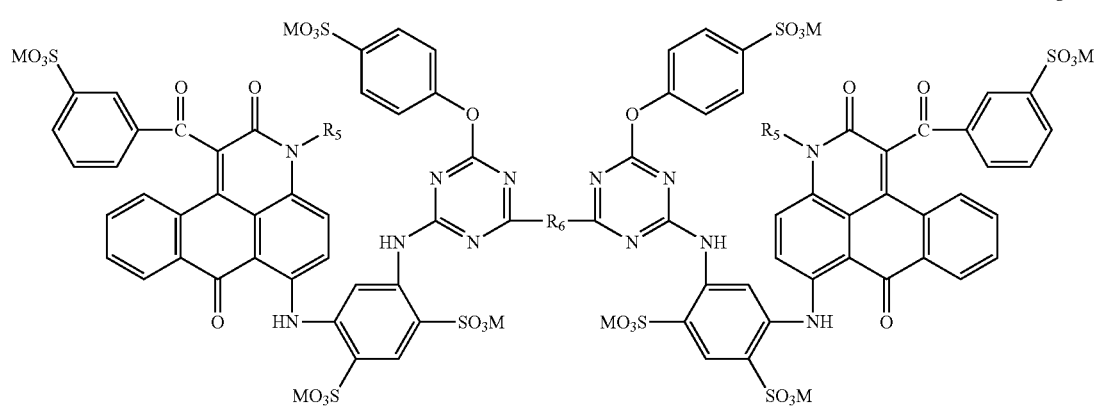

general formula (III)

wherein the dye represented by general formula (III) has an inorganic-organic balance value of 2.0 or more; $R_5$'s each independently represent a hydrogen atom, an alkyl group, a hydroxyalkyl group, a cyclohexyl group, a monoalkylaminoalkyl group, or a dialkylaminoalkyl group; M's each independently represent a hydrogen atom, an alkali metal, ammonium, or organic ammonium; and $R_6$ represents a linking group.

a unit configured to humidify a gap between the recording head and the recording medium, wherein the plural inks stored in the plural ink storage portions include a cyan ink containing a dye represented by general formula (I) and a magenta ink containing a dye represented by general formula (II):

general formula (I)

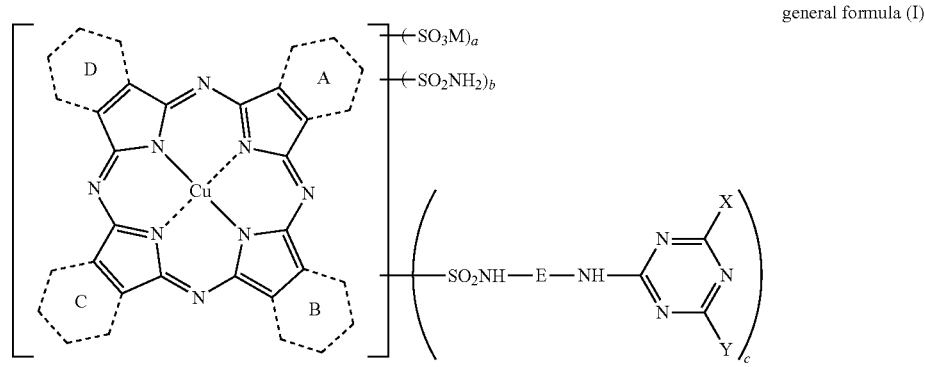

wherein in general formula (I), A, B, C, and D each independently represent an six-membered ring having aromaticity, and at least one of A, B, C, and D represents a pyridine ring or a pyrazine ring; M's each independently represents a hydrogen atom, an alkali metal, ammonium, or organic ammonium; E represents an alkylene group; X represents a sulfo-substituted anilino group, a carboxy-substituted anilino group, or a phosphono-substituted anilino group, and the substituted anilino group may further contain 1 to 4 substituents of at least one type of substituent selected from the group consisting of a sulfonic acid group, a carboxy group, a phosphono group, a sulfamoyl group, a carbamoyl group, a hydroxy group, an alkoxy group, an amino group, an alkylamino group, a dialkylamino group, an arylamino group, a diarylamino group, an acetylamino group, an ureido group, an alkyl group, a nitro group, a cyano group, a halogen atom, an alkylsulfonyl group, and an alkylthio group; Y represents a hydroxy group or an amino group; and a, b, and c satisfy $0 \leq a \leq 2.0$, $0 \leq b \leq 3.0$, and $0.1 \leq c \leq 3.0$, provided that a+b+c=1.0 to 4.0 general formula (II)

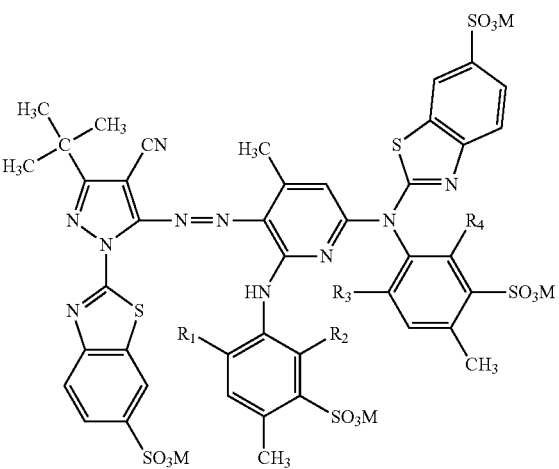

wherein in general formula (II), $R_1$, $R_2$, $R_3$, and $R_4$ each independently represent an alkyl group; and M's each independently represent a hydrogen atom, an alkali metal, ammonium, or organic ammonium.

* * * * *